Oct. 21, 1952  R. T. CLOUD  2,614,432
GRAVITY METER

Filed March 5, 1947  2 SHEETS—SHEET 1

Inventor
RAYMOND T. CLOUD
by
Attys.

Oct. 21, 1952 R. T. CLOUD 2,614,432
GRAVITY METER
Filed March 5, 1947 2 SHEETS—SHEET 2

Inventor
RAYMOND T. CLOUD

Patented Oct. 21, 1952

2,614,432

UNITED STATES PATENT OFFICE 2,614,432

GRAVITY METER

Raymond T. Cloud, Houston, Tex., assignor to North American Geophysical Company, Houston, Tex., a corporation of Texas Application March 5, 1947, Serial No. 732,494

21 Claims. (Cl. 73—382)

This invention relates to a method and apparatus for effecting the accurate comparison of the stress value in a pair of identical coil springs, and has particular application in obtaining a reliable and highly accurate balance of stresses in the support and reference springs of an instrument of the type utilized in measuring the force of gravity, commonly called a gravity meter.

The type of gravity meter which heretofore has enjoyed the largest degree of use generally involves a mass member which is supported by one or more springs, one of which is used to support the bulk of the mass, and will be referred to as the main support spring. The gravitational force acting upon the mass member at any given location of the instrument on the earth's surface is then determined by ascertaining the stress produced in the support spring or more commonly, by adjusting an auxiliary support spring to return the stress conditions in the main support spring to a previously calibrated value.

Heretofore, the ascertainment of a predetermined stress condition in the support spring has been difficult of accomplishment with the required degree of accuracy. The extreme accuracy required is indicated by the fact that for oil exploration purposes, it is desirable to ascertain variations in the force of gravity on the order of $10^{-8}$. Since temperature variations of the components of the gravity meter produce dimensional changes on the order of $10^{-5}$, it is necessary that the components of the gravity meter be enclosed within a constant temperature compartment to eliminate the effects of possible temperature variations between the components. This further complicates the apparatus necessary for determining the existence of a particular stress condition in the support spring.

In gravity meters heretofore known, an optical system has been generally employed for indicating the stress condition of the support spring, but such systems have not been entirely satisfactory inasmuch as the apparatus must necessarily produce a visual indication exteriorly of the insulated container, and cannot be read at points remote from the location of the meter or be conveniently automatically and continuously recorded under field conditions. Furthermore, the magnification of the optical system is limited by the long physical path required, the amount of light available, and the physical dimensions of hairlines and reticules generally utilized for indicating purposes.

Accordingly, it is an object of this invention to provide an improved gravity meter, characterized by an outstanding simplicity of the support spring stress indicating system and by an unusually high degree of accuracy by which the attainment of a particular stress condition in the support spring may be determined.

Another object of this invention is to provide an improved method of determining variations in the force of gravity.

Another object of this invention is to provide an improved gravity meter wherein the stress conditions in a support spring are determined by comparison with an identical reference spring.

A further object of this invention is to provide an improved method and apparatus for effecting a determination of the existence of balanced stress conditions in two independent but identical coil springs, particularly the support and reference springs of a gravity meter.

Another object of this invention is to provide an improved stress balance indicating system for the support and reference springs of a gravity meter wherein the changes in electrical characteristics of the springs produced by the variation of stresses therein are utilized to indicate the attainment of the condition of balanced stresses between the two springs.

A particular object of this invention is to provide an improved stress balancing indicating system for a gravity meter wherein all of the temperature affected components may be conveniently encased within a constant temperature compartment commonly provided for such gravity meters and wherein the adjustment of the force measuring spring may be effected automatically by a power device which operates in response to the departure of the stress condition in the two springs from a balanced condition.

The specific nature of this invention as well as other objects and advantages thereof will become apparent to those skilled in the art from the following detailed description of the annexed sheets of drawings, which by way of preferred examples only, illustrate two specific embodiments of the invention.

Figure 1:
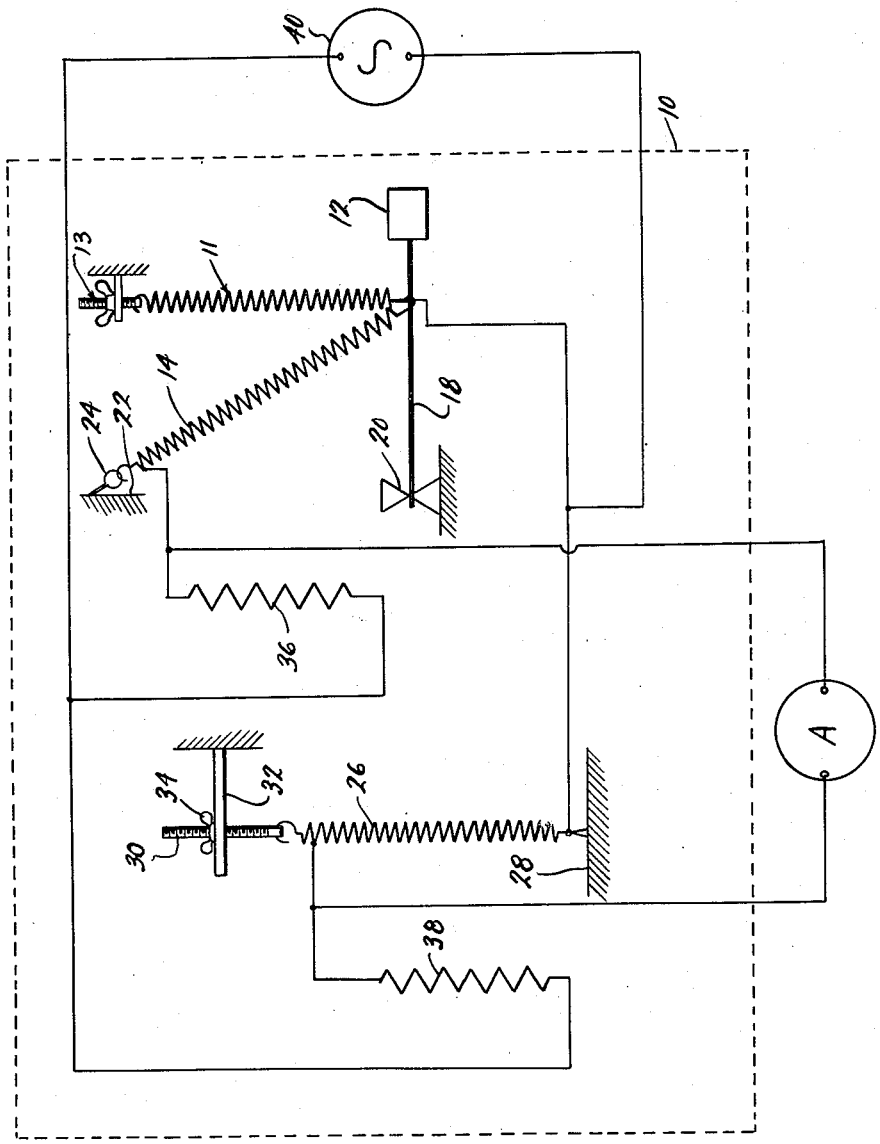
Figure 1 is a schematic view illustrating an embodiment of this invention based upon the utilization of an alternating current Wheatstone bridge as the basic circuit for indicating the attainment of balanced stressed condition.

Fundamentally this invention contemplates the utilization of the inherent change in electrical characteristics of a support spring of a gravity meter as a function of the stress in such spring to indicate the attainment of a predetermined stress condition in such spring and thus indicate variations in the force of gravity Referring to Figure 1, there are schematically shown the essential elements of a gravity meter which are affected by this invention. Within a heat insulated, constant temperature compartment, indicated schematically at 10, the primary elements of a gravity meter are mounted. Such elements conventionally comprise a mass 12 which is suitably supported by a support spring 14 in such manner that the force of gravity acting upon the mass 12 will result in a change in longitudinal stress in the spring 14. For example, the mass 12 may be conveniently mounted upon the end of a support arm 18 which is pivoted at one end in a suitable anti-friction bearing 20. The spring 14 has its lower end suitably secured to an intermediate portion of support arm 18 and its upper end suitably secured to a fixed support 22 as by a ring 24. An auxiliary support spring or measuring spring 11 is generally provided which has an end secured to arm 18 and the other end to a micrometer stress adjusting screw 13. Measuring spring 11 thus supports a portion of the mass 12. Generally the stress in spring 11 is adjusted by vertical movement of micrometer screw 13 to maintain a predetermined calibrated stress condition in support spring 14. Each time that such calibrated stress is produced in support spring 14, the position of micrometer screw 13 is an indication of the change in force of gravity from the calibrated value. Alternatively the effective lever arm of mass 12 with respect to spring 14 could be varied. In either event means are thus provided for effecting minute adjustments of the stress in support spring 14. It should be understood that the particular adjusting device described is merely schematic and representative of any one of well known forms of stress adjusting devices which have heretofore been employed in connection with the measuring spring of a gravity meter.

In accordance with this invention a reference spring 26 is provided within the constant temperature enclosure 10 which is constructed as nearly identical as possible to the support spring 14, and has one end secured to a fixed support 28 and the other end secured to a calibration adjusting device such as a threaded rod 30 which passes through a support bracket 32 and is threadedly engaged by an adjusting nut 34 for relative vertical adjustment.

The support spring 14 and the reference spring 26 are both preferably formed from nickel alloy wire and are carefully wound into highly accurate helical coils. It is therefore obvious that the wire in this form has the electrical characteristics of a long solenoid and the electrical impedance of such solenoid is very sensitive to changes in stress in the spring. Not only does the inductance of the spring change due to changes in configuration of the spring as a function of the stress thereon, but, in addition the material from which the spring is constructed has a resistance which is very sensitive to changes in mechanical stress. Hence, a substantial change in effective electrical impedances of the support coil 14 and reference coil 26 will occur as a function of the stresses applied to such coils.

In accordance with this invention, identical electrical connections are made to the two springs, the electrical characteristics of such springs are incorporated in two separate circuits, and the effective impedances of such circuits are compared to determine the attainment of balanced stress conditions between the support coil 14 and the reference coil 26. In the embodiment of this invention illustrated in Figure 1, the support spring 14 and the reference spring 26 are electrically connected into opposite arms of a Wheatstone bridge. The remaining arms of the bridge may conveniently comprise fixed resistors 36 and 38 which are preferably mounted within the constant temperature compartment to achieve a highly sensitive bridge arrangement substantially independent of ambient temperature variations. While not limited thereto, the resulting bridge circuit is preferably supplied with alternating current from a suitable source 40, for the reason that application of D. C. current will produce stray fields which may possibly have some erroneous effects upon the indicating instrument. The condition of balance of the bridge is indicated by the conventional connection of a sensitive meter A across the opposite corners of the bridge to which the voltage source 40 is connected.

In operation, the gravity meter is first balanced in a null position by means of auxiliary spring 11 and micrometer screw 13 using optical or similar means to determine this position, then a minute adjustment of the tension in reference spring 26 is effected by rotating adjusting nut 34 to obtain vertical adjustment of the threaded rod 30, and such adjustment is continued until the indicating meter A records zero voltage across the diagonal of the electrical bridge. When such condition is attained, it is, of course, an indication that the electrical impedance of the calibrating spring 26 is then identical to the electrical impedance of the measuring spring 14. Hence, as initially calibrated, the stress conditions existing in reference spring 26 will duplicate to a high degree of accuracy the stress conditions in the measuring spring 14. In use, the support spring 14 is always returned to the calibrated condition of stress by adjusting screw 13 to vary the support provided by measuring spring 11. The extent of adjustment of screw 13, of course, is utilized to indicate the change in force of gravity. Thus the stress is not permitted to vary appreciably in main support spring 14, minimizing mechanical hysteresis. It is therefore apparent that this invention provides a greatly improved method and apparatus for indicating stress conditions in a spring by indicating the attainment of balanced stress conditions between such spring and an identical spring, such as the support and reference springs of a gravity meter.

Figure 2:
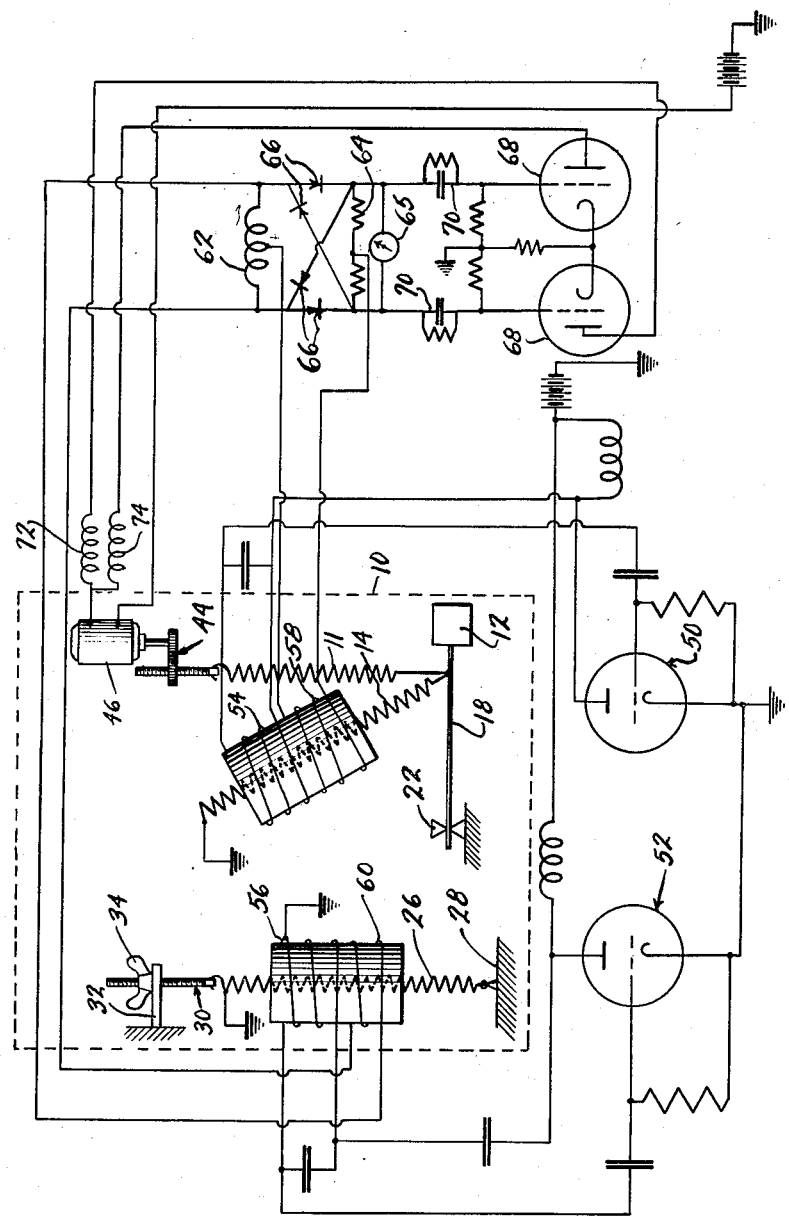
Figure 2 is a schematic view of a modified form of apparatus embodying this invention wherein the stress condition in each of the springs is reproduced as the output frequency of an associated oscillator, and such output frequencies are compared to indicate the attainment of balanced stress condition.

In Figure 2, a modification of this invention is illustrated which is also based upon the same fundamental concept of utilizing the change in electrical characteristics of the support and reference springs in a gravity meter to effect an accurate indication of the attainment of balanced stress conditions in such springs. The arrangement in Figure 2 has an advantage over that of Figure 1 in that it does not require electrical connections to be made to either of the two springs and, hence, eliminates the problem of insulating at least one end of such springs and accommodating current flow through lightweight contacts.

In the modification of Figure 2, the support spring 14 and measuring spring 11 are disposed in similar arrangement with respect to the measuring mass 12 as was heretofore described in connection with Figure 1. Likewise, the reference spring 26 is supported within the constant temperature compartment 10 in similar manner to Figure 1 and is adjustable in stress by calibrating adjusting screw 30. However, a reversible motor 46 is connected to a threaded micrometer adjusting mechanism for the measuring spring 11. Rotation of motor 46 in one direction will increase the tensional stress in measuring spring 11, while rotation in an opposite direction will decrease such stress. Changes in stress of spring 11 of course produce adjustment of the stress condition of support spring 14. Again, the angular position of micrometer device 44 is utilized to indicate changes in the force of gravity from a calibrating value.

In accordance with this invention, a pair of identical oscillator circuits are provided incorporating respectively oscillator tubes 50 and 52. The oscillator circuit associated with tubes 50 and 52 are respectively provided with frequency determining impedances disposed adjacent the support spring 14 and the reference spring 26. Such frequency determining impedances may conveniently comprise tank coils 54 and 56 which respectively surround the support spring 14 and the reference spring 26. The remaining elements of the oscillating circuits are entirely conventional, and it will be apparent to those skilled in the art that each of the oscillators 50 and 52 will generate an output frequency which is a function of the impedance characteristics of the particular spring with which it is coupled.

To compare such output frequencies, pick-up coils 58 and 60 are provided which are respectively coupled with tank coils 54 and 56, and the frequency of the voltages induced in the pick-up coils are compared to produce a comparison voltage which is a function of the difference in such frequencies. The comparison of such voltages may be accomplished by any one of several well known forms of circuits, such as that commonly known as a ring-modulator circuit which, as illustrated in Figure 2, comprises a center tapped inductance 62, a center tapped resistance 64, and a bridge arrangement of half-wave rectifying elements 66. The terminals of one of the pick-up coils, for example the coil 60, is connected across the terminals of inductance 62 while the terminals of the pick-up coil 58 are connected respectively between the center taps of coil 62 and resistance 64. As will be understood by those skilled in the art, the resulting voltage produced across resistor 64 will be a D. C. voltage whose magnitude and direction is a function of the phase shift of the output frequencies of oscillators 50 and 52 respectively. Hence, an indicating meter 65, such as a sensitive ammeter connected across the terminals of resistor 64 will accurately indicate the attainment of zero frequency and phase difference by a zero reading. When such zero frequency and phase difference exists between the frequency generated by oscillators 50 and 52, it is obvious that the electrical impedance characteristics of the support spring 14 and the reference spring 26 are identical, and therefore, that the stress conditions in such springs are likewise substantially identical. Hence, an accurate indication of the attainment of balance stress conditions in reference spring 26 and support spring 14 is thereby attained.

For additional clarification as to the operation of a frequency comparison circuit, reference may be made to my copending application entitled "Pendulum and Acceleration Compensation Method and Apparatus," Serial No. 18,775 filed April 3, 1948.

A further feature of the apparatus shown in Figure 2 is that such apparatus may be conveniently utilized to effect automatic adjustment of the stress condition of measuring spring 11 so as to continuously maintain a stress condition in support spring 14 identical to that residing in reference spring 26. To effect such automatic adjusting action, the voltage across center-tapped resistor 64 is applied to the grids of a pair of push-pull connected amplifiers 68 through a conventional anti-hunting network 70 of resistances and condensers.

The load impedance for the amplifier tubes 68 respectively comprise field coils 72 and 74 of motor 46. The armature of motor 46 is connected between the central connection of field coils 72 and 74 and the common cathode connection of amplifiers 68. Hence, for one polarity of voltage appearing across center-tapped resistor 64, the motor 46 will be driven in one direction and for the opposite polarity, the motor 46 will be driven in the opposite direction. The direction of rotation of the motor is, of course, correlated with the electrical effects produced by the resulting change in tension of main support spring 14 so that the motor 46 continuously tends to adjust the measuring spring 11 to maintain a condition of zero voltage across center tap resistor 64 which, of course, corresponds to attainment of balanced stress conditions in reference spring 26 and main support spring 14, or attainment of the calibrating conditions.

The apparatus represented in Figure 2 has a particular advantage in that the motor 46 may be connected to a continuous recording device for recording variations of the force of gravity over long periods of time at a single location, or may be connected to some form of telemetering device such as a Selsyn motor, whereby readings could be observed at points remote from the actual location of the instrument. Such an arrangement would be particularly suitable for underwater surveys where the meter would be lowered to the bottom.

Those skilled in the art will recognize that in both modifications of this invention the employment of a reference spring is merely a convenient manner of obtaining an electrical impedance having characteristics identical with the electrical characteristics of the main support spring. Any other means having identical electrical impedance characteristics could obviously be substituted for the reference spring 26.

It is therefore apparent that the method and apparatus embodied in this invention constitute an unusually simple and advantageous arrangement of readily manufactured components which cooperate to produce a degree of accuracy and flexibility in operation of a gravity meter which has heretofore been unobtainable.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A gravity meter comprising a measuring mass, a main support spring supporting said mass, a reference spring substantially identical to said main support spring, adjustable means for varying the stress in the main support spring, a first electrical circuit including said main support spring as an impedance determining element thereof, a second electrical circuit including said reference spring as an impedance determining element thereof, and means for electrically comparing the effective impedance of said first and second circuits including an indicating meter having a predetermined deflection when the electrical impedance effect of said main support spring equals the electrical impedance effect of said reference spring.

2. A gravity meter comprising a measuring mass, a main support spring supporting said mass, a reference spring substantially identical to said measuring spring, adjustable means for varying the stress of said main support spring, and an electrical bridge circuit including said main support spring and said reference spring in opposed arms thereof for current flow through said springs, said bridge circuit including means for indicating when the electrical impedance of said main support spring equals the impedance of said reference spring.

3. A gravity meter comprising a measuring mass, a support spring supporting at least a portion of said mass, a reference spring substantially identical to said support spring, adjustable means for varying the stress in said support spring, means defining a constant temperature compartment enclosing said support spring and said reference spring, a first electrical circuit including said support spring as an impedance determining element thereof, a second electrical circuit including said reference spring as an impedance determining element thereof, and means for electrically comparing the effective impedances of said first and second circuits including an indicating meter having a predetermined deflection when the electrical impedance effects of said support spring equals the electrical impedance effects of the said reference spring.

4. A gravity meter comprising a measuring mass, a main support spring supporting said mass, a reference spring substantially identical to said main support spring, adjustable means for varying the stress in said support spring, means defining a constant temperature compartment enclosing said support spring and said reference spring, and an electrical bridge circuit including said main support spring and said reference spring in opposed arms thereof for current flow through said springs, said bridge circuit including means for indicating when the electrical impedance of said main support spring equals the electrical impedance of said reference spring.

5. A gravity meter comprising a measuring mass, a main support spring supporting said mass, a reference spring substantially identical to said main support spring, adjustable means for varying the stress in said main support spring, power means for operating said adjustable means, a first electrical circuit including said main support spring as an impedance determining element thereof, a second electrical circuit including said reference spring as an impedance determining element thereof, means for electrically comparing the effective impedance of said first and second circuits to produce electrical energy having a characteristic varying as a function of the difference of the effective impedance of said first and second circuits, and means for energizing said power means as a function of said characteristic to operate said adjustable means to continuously equalize the electrical impedance effects of said main support spring to that of said reference spring.

6. A gravity meter comprising a measuring mass, a main support spring supporting said mass, a reference spring substantially identical to said main support spring, adjustable means for varying the stress in said main support spring, a first oscillator circuit having a frequency determining impedance disposed adjacent said measuring spring, whereby the output frequency of said first oscillator circuit varies as a function of the stress in said main support spring, a second oscillator circuit having a frequency determining impedance disposed adjacent said reference spring in identical relation thereto as the corresponding impedance of said first oscillator circuit bears to said main support spring whereby the output frequency of said second oscillator circuit varies as a function of the stress in said reference spring, circuit means for comparing said output frequencies of said first and second oscillator circuits to produce a comparison voltage variable as a function of the difference of said output frequencies, and indicating means responsive to said comparison voltage to indicate the condition of equal stresses in said main support reference springs.

7. A gravity meter comprising a measuring mass, a support spring supporting said mass, a reference spring substantially identical to said support spring, adjustable means for varying the stress in said support spring, a first oscillator circuit having a frequency determining impedance disposed adjacent said support spring, whereby the output frequency of said first oscillator circuit varies as a function of the stress in said support spring, a second oscillator circuit having a frequency determining impedance disposed adjacent said reference spring in identical relation thereto as the corresponding impedance of said first oscillator circuit bears to said support spring, whereby the output frequency of said second oscillator circuit varies as a function of the stress in said reference spring, means defining a constant temperature compartment enclosing said support and reference springs and said frequency determining impedances, circuit means for comparing said output frequencies of said first and second oscillator circuits to produce a comparison voltage variable as a function of the difference of said output frequencies, and indicating means responsive to said comparison voltage to indicate the condition of equal stress in said support and reference springs.

8. A gravity meter comprising a measuring mass, a support spring supporting said mass, a reference spring substantially identical to said support spring, adjustable means for varying the stress in said support spring, power means for operating said adjustable means, a first oscillator circuit having a frequency determining coil surrounding said support spring, whereby the output frequency of said first oscillator varies as a function of the stress in said support spring, a second oscillator circuit having a frequency determining coil surrounding said reference spring in identical relation thereto as the coil of said first oscillator circuit bears to said support spring, whereby the output frequency of said second oscillator circuit varies as a function of the stress in said reference spring, circuit means for comparing said output frequencies of said first and second oscillator circuits to produce a comparison voltage variable as a function of the difference of said output frequencies, and means for energizing said power means as a function of said comparison voltage to operate said adjustable means to continuously equalize the stress in said support spring to that in said reference spring.

9. Apparatus for balancing stresses in two identical springs comprising means for applying a calibrated stress to one of said springs, means for adjusting the stress in the other of said springs, a first electrical circuit including said one spring as an impedance determining element thereof, a second electrical circuit including said other spring as an impedance determining element thereof, and means for electrically comparing the effective electrical impedance of said first and second circuits including an indicating meter having a predetermined deflection when the electrical impedance effects of said other spring equals the electrical impedance effects of said one spring.

10. Apparatus for balancing the stresses in two springs comprising means for subjecting one of said springs to a calibrating stress, means for adjusting the stress in the other of said springs, an electrical bridge circuit including said one spring in one arm thereof and said other spring in an opposed arm for current flow through said springs, said bridge circuit including means for indicating when the electrical impedance of said one spring equals the electrical impedance of said other spring.

11. A gravity meter comprising a measuring mass, a main support spring supporting said mass, adjustable means for varying the stress in said main support spring, a first electrical circuit including said main support spring as an impedance determining element thereof, reference means having identical impedance determining characteristics as said main support spring in one stress condition, a second electrical circuit including said reference means as an impedance determining element thereof, and means for electrically comparing the effective impedances of said first and second circuits, including an indicating meter having a predetermined deflection when the electrical impedance effects of said main support spring equals the electrical impedance effect of said reference means.

12. A gravity meter comprising a measuring mass, a main support spring supporting at least a portion of said mass, adjustable means for varying the stress of said main spring, a reference impedance having substantially identical electrical impedance characteristics as said main support spring in one stress condition, an electrical bridge circuit including said main support spring and said reference impedance in opposed arms thereof for current flow therethrough, said bridge circuit including means for indicating when the electrical impedance of said main support spring equals the said reference impedance.

13. A gravity meter comprising a measuring mass, a main support spring supporting at least a portion of said mass, adjustable means for varying the stress in said main support spring, a first oscillator circuit having a frequency determining impedance disposed adjacent said measuring spring, whereby the output frequency of said first oscillator circuit varies as a function of the stress in said measuring spring, a second oscillator circuit for generating a calibrating frequency, circuit means for comparing said output frequencies of said first and second oscillator circuits to produce a comparison voltage variable as a function of the difference of said output frequencies, and indicating means responsive to said comparison voltage to indicate the attainment of a predetermined stress condition in said main support spring.

14. A method of determining the attainment of a predetermined stress condition in a spring comprising providing a reference impedance having identical electrical impedance determining characteristics as said spring in one stress condition, coupling said spring and said reference impedance respectively in identical manner into two electrical circuits to modify the effective electrical impedances of said circuit, adjusting the stress in said spring, and electrically comparing the effective electrical impedances of said circuits to indicate when the electrical impedance effect of said spring and said reference impedance are identical.

15. A method for determining variations in the force of gravity upon a measuring mass which comprises supporting at least a portion of the measuring mass by a support spring, providing a reference impedance having substantially identical electrical impedance characteristics as said support spring in one stress condition, coupling said spring and said reference impedance respectively in identical manner into electrical circuits to modify the effective electrical impedances of said circuit, adjusting the stress in said support spring, and electrically comparing the effective electrical impedances of said circuits to indicate when the impedance characteristics of said support spring are equal to those of said reference impedance.

16. A method of measuring variations in the force of gravity upon a measuring mass which comprises supporting at least a portion of said mass by a support spring, providing a reference spring substantially identical to said support spring, coupling said support spring and said reference spring respectively in identical manner into two electrical circuits to modify the effective electrical impedances of said circuits, adjusting the stress in said support spring, and electrically comparing the effective electrical impedances of said circuits to indicate when equal stress is obtained in said support and reference springs.

17. A method for determining variations in the force of gravity upon a measuring mass which comprises supporting at least a portion of the measuring mass by a support spring, providing a reference spring substantially identical to said support spring, adjusting the stress in the reference spring to duplicate that in the support spring for a calibrated condition, and adjusting the stress in the support spring by comparison with the reference spring to return the stress to the calibrated value when subject to unknown values of the force of gravity.

18. A gravity meter comprising a measuring mass, a support spring supporting at least a portion of said mass, a reference spring substantially identical to said support spring, circuit means for measuring the stress in said springs as a function of a measurable electrical variable, means for adjusting the stress in said reference spring to equal that in said support spring under a calibrated force of gravity condition, and means for adjusting the stress in said support spring under uncalibrated conditions to equal that of said reference spring in response to said measurements.

19. In combination with a null-type gravity meter, a support spring in the form of a solenoid, an identical reference comparison spring, means to stress said support spring in response to variations in the force of gravity, and electric circuit means connected to said support spring and said comparison spring to measure said variations in the force of gravity as manifested by variations of inductance and resistance in said support spring from a predetermined null reference value of said comparison spring.

20. In a gravity meter, the combination of a measuring mass response to variations in the force of gravity, a support spring for said mass in form of a solenoid, a reference spring, electric circuit means connected to said support spring and said reference spring, and means to stress said support spring in response to movements of said measuring mass, said electric circuit means including elements for detecting variations of inductance and resistance in said support spring from a null value established in said reference spring, whereby said gravity meter may be nulled in response to said variations.

21. The method of nulling a gravity meter which includes the steps of stressing and elongating a coil spring in response to variations in the force of gravity, measuring a null-impedance value in an identical pre-stressed reference spring, measuring impedance variations in said first mentioned spring by comparison to the null-impedance value of said reference spring, and nulling said gravity meter in response to said impedance variations.

RAYMOND T. CLOUD.

REFERENCES CITED

The following references are of record in the file of this patent:

UNITED STATES PATENTS

| Number | Name | Date |
| --- | --- | --- |
| 1,796,150 | Hamer | Mar. 10, 1931 |
| 2,180,175 | Sivertsen | Nov. 14, 1939 |
| 2,240,849 | Lubcke | May 6, 1941 |
| 2,306,137 | Pabst | Dec. 22, 1942 |
| 2,316,915 | Truman | Apr. 20, 1943 |
| 2,322,681 | Zenor | June 22, 1943 |
| 2,435,231 | McPherson | Feb. 3, 1948 |
| 2,525,587 | Cahn | Oct. 10, 1950 |

OTHER REFERENCES

"Resistance Wire Strain Gage Equipment for Static and Dynamic Testing," pages 608–613 of Product Engineering, September 1945.